United States Patent [19]

Harvey et al.

[11] Patent Number: 6,120,812
[45] Date of Patent: Sep. 19, 2000

[54] FOODSTUFF PRESERVATION WITH IODINATED ICE

[75] Inventors: Wayne A. Harvey, Halifax; Terence F. Mullins; Daniel J. MacDonald, both of Dartmouth, all of Canada

[73] Assignee: IoSolutions Incorporated, Nova Scotia, Canada

[21] Appl. No.: 09/106,366

[22] Filed: Jun. 29, 1998

[30] Foreign Application Priority Data

Feb. 18, 1998 [CA] Canada ................................. 2229964

[51] Int. Cl.⁷ ............................ A23B 4/08; A23L 3/34; A23L 3/37
[52] U.S. Cl. ....................... 426/66; 426/327; 426/332; 426/335; 426/524; 426/532
[58] Field of Search ........................ 426/327, 66, 74, 426/321, 332, 331, 532, 524, 335

[56] References Cited

U.S. PATENT DOCUMENTS

| 3,958,026 | 5/1976 | Leone et al. | 426/332 |
|---|---|---|---|
| 4,022,882 | 5/1977 | Ely | 424/80 |
| 4,261,837 | 4/1981 | West et al. | 210/754 |
| 4,555,347 | 11/1985 | O'Dowd et al. | 210/752 |
| 4,935,064 | 6/1990 | Robbins et al. | 134/2 |
| 5,919,374 | 7/1999 | Harvey et al. | 210/753 |

FOREIGN PATENT DOCUMENTS

| 341576 | 1/1931 | United Kingdom. |
|---|---|---|
| WO 9855404 A1 | 12/1998 | WIPO. |

*Primary Examiner*—Keith D. Hendricks
*Attorney, Agent, or Firm*—Pillsbury Madison & Sutro LLP

[57] ABSTRACT

A method of preserving without bacterial spoilage and reducing the risk of bacterial contamination during the storage and/or transfer of foodstuffs, comprising treating said foodstuff or the locus of said foodstuff with a bacterially-effect amount of iodinated ice. The method is of particular value in the preservation of fish and fish products.

5 Claims, No Drawings

FOODSTUFF PRESERVATION WITH IODINATED ICE

FIELD OF THE INVENTION

This invention relates to the preservation of foodstuffs, particularly foodstuffs such as fish, meat, fish and meat products, and fruit and vegetables susceptible to bacterial spoilage, with iodinated ice.

BACKGROUND TO THE INVENTION

Iodine is a black-blue-to-violet crystalline solid at standard temperatures and pressures and is only sparingly soluble in water at 20° C. (0.29 g/100 g). Traditionally, crystalline iodine is dissolved in water by the addition of small amounts of KI, which greatly enhances the dissolution of the iodine. Dissolved $I_2$ hydrolyzes to form HOI in amounts proportional to the pH of the solution, wherein above pH 8.5, iodine is present almost exclusively as HOI (Chang, 1958). Both dissolved $I_2$ and HOI possess antipathogenic properties. At low pHs, e.g., 5–7, iodine exhibits antibacterial action, whereas at higher pHs, e.g., 8–10, it is an efficient virucide. Chang (1958) reports that above pH 8, HOI decomposes slowly to form iodide and iodate ions, especially in the presence of dissolved iodides; neither iodides nor iodates have found to be germicidal to date. Further, $I^-$ may react with $I_2$ to form the highly coloured $I_3^-$ ion, which is also ineffectual as a germicide. Based on elementary thermodynamic principles, the addition of dissolved iodine to water will significantly reduce the freezing point of the water to which it is added.

The disinfectant properties of iodine have been known since the $19^{th}$ century and, indeed, iodine was employed on a large scale for water disinfection during World War I.

The use of iodine as a food additive has been limited mainly to the addition of KI to NaCl (table salt) to produce so-called "iodized salt", which is used as the primary source of consumed iodine in North America. The beneficial biochemical effects of iodine have been well documented since about the turn of the century. In emergency situations, up to 10 ppm iodine may be consumed for short periods of time according to USEPA guidelines on drinking water quality, without being considered toxic to humans. Iodine has been added to food products per se only to prevent diseases associated with iodine deficiency, e.g., goitre and mental retardation. As a result, iodine as a food disinfectant germicidal inhibitor or as a preservative, in the context of preventing decay of food by micro-organisms has not been reported.

Although iodine is readily added to liquid water which can be subsequently frozen, almost no systematic work has been published concerning the behaviour of iodinated water-ice. There are no easily available tables, for example, documenting the lowering of the freezing point of water with increasing concentrations of dissolved iodine, in whichever chemical form. Further, no work has been published concerning the biocidal/biostatic nature of iodinated water-ice.

Ice and water-ice mixtures have been used as a refrigerant for several millenia and their use as an industrial refrigerant is also still prevalent today, especially with the need to deliver unspoiled, perishable foodstuffs to market in mass quantities by meat and produce suppliers across the world. Although the cooling of foodstuffs to near or below freezing temperatures, i.e. at or below 0° C. does prevent their spoilage in large measure, it does not always ensure that any potential airborne, iceborne or waterborne pathogens with which the foodstuffs may have come into contact are rendered harmless to human consumers. That is, although ice may preserve foodstuffs from heat spoilage and chemical breakdown, it does not possess antibiotic qualities. Ice is just as able to preserve bacteria, viruses and cysts within the ice itself or on the surfaces of foodstuffs as it is able to somewhat preserve and protect the foodstuffs themselves.

Chilled or refrigerated fish quality declines rapidly, due in large measure to the presence of spoilage bacteria (Liston, 1982). The number of these spoilage bacteria present, therefore, has a profound effect on the shelf life of these fish. With fish being stored in the holds of trawlers for sometimes many days before landing, any effective bacterial inhibitor will have a significant impact on the quality of the fish when it reaches the processing plant. This is of prime importance today when stocks of some species, such as cod are low, but demand remains high.

It should be recognized that several problems exist in using ice as both a refrigerant and preservative of foodstuffs. The main problem is that many common pathogens are well able to survive cooling to 0° C. and below. Cooling to these temperatures only serves to prevent breakdown and spoilage of the foodstuff due to heat, and may slow, but not eliminate pathogenic activity. In fact, some pathogens, especially viruses, are quite able to flourish at freezing temperatures. For example, fish infected by a pathogen and subsequently stored on ice may emerge from storage being more heavily laden with pathogen than before it was stored. In this case, not only does the fish emerge infected, but so does the ice-melt-water used to store the very fish it was meant to protect. "Spent" or used ice or melt-water would then become a viable biohazard and the storage vessels themselves would become contaminated and become vectors for future infection of foodstuffs.

There, thus, remains a need for a biologically safe refrigerant system involving ice whenever alternative mass storage and delivery of vulnerable foodstuffs systems are not available. The need is particularly significant where the foodstuff intrinsically contains bacteria, e.g. fish products, and spoilage caused by the growth of such bacteria must be avoided.

SUMMARY OF THE INVENTION

It is an object of the present invention to provide a method of enhancing the safety of stored and/or transported perishable foodstuffs subject to bacterial spoilage.

It is a further object of the present invention to provide a perishable foodstuff susceptible to bacterial spoilage wherein said foodstuff is contained in contact with an iodinated ice mixture.

Accordingly, in one aspect the invention provides a method of preserving without bacterial spoilage and reducing the risk of bacterial contamination during the storage and/or transfer of foodstuffs, comprising treating said foodstuff or the locus of said foodstuff with an antipathogenically effective amount of iodinated ice.

By the term "iodinated ice" in this specification and claims means a mixture of ice containing iodinated species, optionally, with acceptable amounts of water as to not cause total melting of the ice to permit any temperature increase.

By the term "iodine species" is meant, collectively, dissolved molecular iodine and hypoiodous acid species present in the iodinated ice. The ppm concentrations herein refer to the concentrations of these species determined as free molecular iodine. The pH of the iodinated ice or ice/water composition may be that extending from pH 4–10, preferably that of natural waters in the range 5.5–8.5, and more preferably within the range pH 8–10.

Most preferably, the iodinated ice is potassium iodide free. Thus, the iodinated ice of use in the practice of the present invention is made most preferably by dissolution of USP grade, flake crystalline iodine into water without the presence of potassium iodide or other solubilizing compounds.

It is common knowledge that most bactericides, iodine included, work at elevated, i.e. ambient, temperatures relative to lower temperatures. Ice-cold temperatures would a priori be expected to reduce bactericide and viricide activity of iodine and, diminish its expected antipathogenic efficacy and, thus, at such low temperatures efficacious results with respect to bacterial and viral kill rates would not be expected. Further, it is possible that some pathogens may actually thrive at colder temperatures, and may even be more resistant to iodine under such conditions as encountered at or near freezing. Viruses are relatively oblivious to cold temperatures. Many bacteria are known to withstand extreme cold, and may even enter a hibematory phase capable of tolerating cold environments, and in some cases, e.g. Pseudomonads spp. may even actively produce biochemical/ bioactive substances such as gel-coats or "anti-freeze" compounds which would protect them from the cold, and maybe possibly against iodine. Therefore, by using iodinated ice, an efficacious rate of preservation, for example, fish flesh superior to that afforded by using "pure water" ice, based on purely kinetic factors could not a priori have been expected, particularly when the frozen ice-iodine species constitutes a non-homogeneous two phase system.

A preferred process of preparing the iodinated ice comprises (a) providing a flowing supply of water to be subsequently frozen; determining the pH of said flowing supply of water; adjusting the pH of said water to between 4–10, preferably 5.5–8.5 and more preferably about pH 10; diverting a first portion of said flowingg supply of water from a non-diverted second portion of said flowing water and dissolving solid iodine in said diverted first portion of said flowing water under dynamic aqueous flow to produce a concentrated aqueous solution of iodine containing 100–1000 ppm iodine; measuring the temperature of the concentrated aqueous iodinated solution; then blending the concentrated aqueous iodine solution into the non-diverted second portion of the flowing supply of water in an amount, based on the water temperature and pH, effective to kill viruses and bacteria present in the water; maintaining the iodine and water in contact for a time sufficient to kill any of said virus and bacteria; recovering the thus treated water, and (b) partially or wholly freezing said iodinated water to provide said iodinated ice. Preferably, the iodine and water are maintained at a pH selected from 5.5–10, and more preferably at 9–10.

The iodinated water can be frozen at controlled rates with standard ice-making machines.

The iodinated water generation method and apparatus of use in the practice of the present invention provides for the production of iodinated water under a broad range of temperature, pH and flow rate conditions, for example, at 4–5° C., pH 5–10 and 1–60 l/min. The efficiency of the iodine dissolution process is significantly improved at a pH 9–10, relative to pH 7–8.

An iodinated ice mixture made from an aqueous solution at a pH 9.5 and an iodinated species concentration of 2–20 ppm has been found to be satisfactorily efficacious.

We have found that the physical appearance of iodinated ice varies with the concentration of iodine over a range of iodine concentrations, from 10 ppm to about 240 ppm, employing a gradual freezing process, as expected, given the preference of iodine to remain in the aqueous phase as long as possible, the iodine concentration increases visibly within any given resultant cube of ice towards the centre of the cube, i.e., via the mechanism of fractional crystallization. In addition, below freezing, a two-phase system evolves at all concentrations, except <5 ppm.

The overall aim of using iodinated water-ice according to the invention is to enhance the preservation of foodstuffs both by eliminating existing pathogens in the water to be frozen, and/or to kill pathogens already present on the foodstuff. It is not intended that the invention process disinfects foodstuffs via the invention process throughout the main body of the foodstuff, as this would require the uptake of iodine by the pre-harvested food resource. The main object is to prevent subsequent contamination and minimize pathogenic spoilage. Pathogens already present within the foodstuff are herein referred to as being "internal", whereas pathogens contaminating the foodstuff during or after processing are referred to as being "external". Of the 3 major types of pathogens, namely, bacteria, viruses and cysts, the invention is of particular value in controlling bacteria, and in particular surficial bacteria which may be spread from lot to lot, e.g., fish to fish, during food processing procedures, or by careless handling after processing. For example, bacteria normally resident in the gut of a fish and which should never reach humans under "normal" processing conditions, may be spread to the exposed surfaces of the fish fillet during entrail removal.

EXAMPLES

In order that the invention may be better understood, preferred embodiments will now be described by way of example only, as follows.

The present invention provides two main practical embodiments, viz. (a) iodinated ice as a reservoir for iodine for disinfection in the short term, e.g trawler cargo holds, and in the longer term, e.g. for foodstuff preservation during transport/awaiting sale; and (b) using iodine for pre-consumption disinfection of water to be used as ice with an intention of using the ice per se as a disinfectant agent. These two embodiments although subtly different are distinct in that 1. the concentration of iodine required for each application is different;
2. the pH adjustment mechanism, degree and timing of pH adjustment of water to be iodinated and subsequently frozen, vary depending upon whether only the water to be frozen needs to be disinfected before use and not retain sufficient iodine so as to be biocidal, as in case (b) hereinabove, or whether the ice per se is intended to release iodine at biocidally significant concentrations and pHs, i.e., the ice itself must be frozen such that it retains the iodine at a given pH;
3. the mechanism and rates of freezing is, preferably, carefully controlled in case (a) above, and not necessarily so for case "b", owing to the possible loss of iodine due to gassing off or re-precipitation from solution at surrounding ambient temperatures;
4. the useable lifetime of the ice and maintenance of ambient temperature below 0° C. is important for case (a) above, but not necessarily so for case (b) above, given that the addition of iodine to water will effectively lower the freezing point of water on the basis of elementary thermodynamic considerations.

Microbiological Studies

Four hundred Atlantic cod were caught by Otter trawl, bled and gutted, and washed and iced according to four different treatments involving 100 fish per treatment, as follows:

RR—regular wash/regular ice
RI—regular wash/iodinated ice
IR—iodinated wash/regular ice
II—iodinated wash/iodinated ice Wherein
"regular wash" means that the wash water ice was surface water at the harvesting location.
"regular ice" means ice made from potable fresh water with the ice-making equipment at a local fish plant.

Iodinated wash water of about 10 ppm was made by contacting an iodine crystals-containing chamber to a water supply on the trawler.

Iodinated ice (5 ppm) was made from the iodinated water by the aforementioned ice-making equipment. The fish were kept in ice for 19 days and sampled at intervals for the purposes of microbiological, chemical and sensory (raw and cooked) analyses.

Aerobic plate counts (APC) revealed that the use of iodinated ice had an effect on bacterial numbers. Significantly lower plate counts were observed when APC's of fish stored in iodinated ice were compared to those of fish stored in regular ice, as follows:

(i) RI was significantly lower than RR up to and including day 10 of the experiment;
(ii) II was significantly lower than RR up to and including day 12 of the experiment;
(iii) II was significantly lower than IR up to and including day 14 of the experiment;
(iv) An overall trend of significantly lower counts for treatment RI versus treatment IR was observed for up to and including day 17 of the experiment, although differences were not significant on days 3 and 12.
(v) Over the first 12–14 days, the APC's for RR fish on any given day were not observed on It fish until 4–5 days later.

It can be seen from the above data that the type of wash water used did not contribute greatly to the differences observed in APC's. Except for the occasional sampling day, significant differences in APC's generally were not observed between treatments RI and II, nor between treatments IR and RR.

Rough estimates of the numbers of actual spoilage bacteria present on the fish were obtained by selecting isolates from the RR and II treatments, determining the proportion of isolates capable of producing off-odors in sterile fish juice and then multiplying the appropriate proportions and APC's together. The numbers of spoilage bacteria were significantly lower for the II fish than for the RR fish. This effect was observed over the first 12 days of the study.

Although this disclosure has described and illustrated certain preferred embodiments of the invention, it is to be understood that the invention is not restricted to those particular embodiments. Rather, the invention includes all embodiments which are functional or mechanical equivalents of the specific embodiments and features that have been described and illustrated.

What is claimed is:

1. A method of preserving without bacterial spoilage and reducing the risk of bacterial contamination during the storage and/or transfer of foodstuffs, comprising treating said foodstuff or the locus of said foodstuff with a bacterially-effective amount of iodinated ice containing dissolved molecular iodine and hypoiodous acid species, the iodinated ice being made by dissolution of solid iodine into water without the presence of potassium iodide or other solubilizing compounds.

2. A method as defined in claim 1 wherein said iodinated ice comprises 2–20 ppm free iodine.

3. A method as defined in claim 1 or claim 2 wherein said treated foodstuff is maintained at a temperature of less than 0° C.

4. A method as defined in an claim 1 wherein said foodstuff is fish or a fish based product.

5. A method of preserving without bacterial spoilage and reducing the risk of bacterial contamination during the storage and/or transfer of foodstuffs, comprising treating said foodstuff or the locus of said foodstuff with a bacterially-effective amount of iodinated ice containing dissolved molecular iodine and hypoiodous acid species, the iodinated ice being free of potassium iodide.

* * * * *